US012639719B2

(12) United States Patent  
Buhariwala et al.

(10) Patent No.: US 12,639,719 B2  
(45) Date of Patent: May 26, 2026

(54) USE OF CUSTOMER ENGAGEMENT DATA TO IDENTIFY AND CORRECT SOFTWARE PRODUCT DEFICIENCIES

(71) Applicant: Microsoft Technology Licensing, LLC, Redmond, WA (US)

(72) Inventors: Karl Buhariwala, Sammamish, WA (US); Adity Agarwal, Redmond, WA (US); Ganga Narayanan, Kirkland, WA (US); Kiran Nallabothula, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 307 days.

(21) Appl. No.: 17/960,574

(22) Filed: Oct. 5, 2022

(65) Prior Publication Data

US 2024/0119462 A1 Apr. 11, 2024

(51) Int. Cl.  
*G06F 11/362* (2025.01)  
*G06Q 30/016* (2023.01)

(52) U.S. Cl.  
CPC ......... *G06Q 30/016* (2013.01); *G06F 11/366* (2013.01)

(58) Field of Classification Search  
CPC ... G06Q 30/016; G06F 11/323; G06F 3/0482; G06F 11/366  
See application file for complete search history.

(56) References Cited

U.S. PATENT DOCUMENTS

| | | | |
|---|---|---|---|
| 7,293,201 B2 | 11/2007 | Ansari et al. | |
| 10,289,528 B2 | 5/2019 | Calla et al. | |
| 10,585,682 B2 | 3/2020 | Jain et al. | |
| 10,833,951 B2 | 11/2020 | Do et al. | |
| 11,222,296 B2 | 1/2022 | Sun et al. | |
| 11,257,100 B2 | 2/2022 | Konstantinova et al. | |
| 2016/0274961 A1 | 9/2016 | Thomas et al. | |
| 2017/0316438 A1 | 11/2017 | Konig et al. | |
| 2020/0258013 A1 | 8/2020 | Monnett et al. | |
| 2020/0349582 A1* | 11/2020 | Savir ..................... | G06N 20/10 |
| 2021/0211347 A1 | 7/2021 | Vasseur et al. | |

(Continued)

OTHER PUBLICATIONS

Endert et al. The State of the Art in Integrating Machine Learning into Visual Analytics. Computer graphics forum. vol. 36. No. 8. 2017. Retrieved from the Internet: <https://onlinelibrary.wiley.com/doi/epdf/10.1111/cgf.13092> (Year: 2017).*

(Continued)

*Primary Examiner* — S. Sough  
*Assistant Examiner* — Cheneca Smith  
(74) *Attorney, Agent, or Firm* — Holzer Patel Drennan

(57) ABSTRACT

A method for automatically identifying a root cause of customer dissatisfaction with a software product and creating feedback items to improve the software product includes collecting engagement data pertaining to interactions between a customer and a flow of visual elements presented by the software product and detecting a trigger event indicating that the customer is dissatisfied with the software product. In response to the trigger event and based at least in part on the engagement data, a potential deficiency of the software product is automatically identified and a repair ticket is generated for a development team. The repair ticket identifies the potential deficiency of the software product.

19 Claims, 5 Drawing Sheets

(56)     References Cited

U.S. PATENT DOCUMENTS

2021/0241289 A1* 8/2021 Roy ..................... G06N 20/00
2022/0374956 A1* 11/2022 Jungmeisteris ....... G06F 3/0482

OTHER PUBLICATIONS

Wu, Ziming, et al. "Predicting and diagnosing user engagement with mobile ui animation via a data-driven approach." Proceedings of the 2020 CHI conference on human factors in computing systems. 2020. Retrieved from the Internet<https://link.springer.com/article/10.1186/s40561-018-0080-z> (Year: 2020).*

"Application Insights overview", Retrieved from: https://docs.microsoft.com/en-us/azure/azure-monitor/app/app-insights-overview, Jul. 31, 2022, 7 Pages.

"Exploratory Testing and Feedback Management using Azure DevOps Server 2019", Retrieved from: https://azuredevopslabs.com/labs/devopsserver/exploratorytesting/#overview, Mar. 15, 2019, 16 Pages.

International Search Report and Written Opinion received for PCT Application No. PCT/US2023/031360 mailed on Oct. 31, 2023, 18 pages.

International Preliminary Report on Patentability received for PCT Application No. PCT/US23/031360, mailed on Apr. 17, 2025, 13 pages.

* cited by examiner

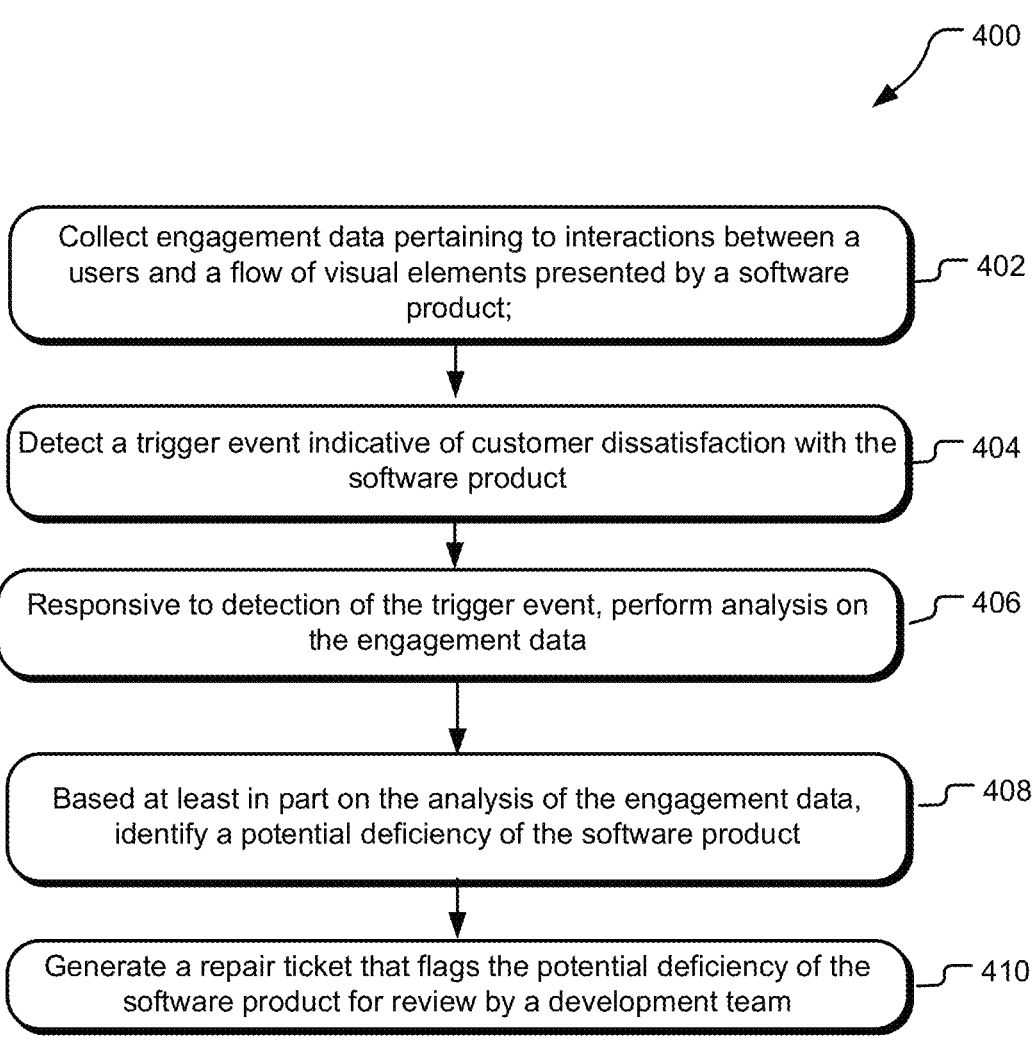

400

Collect engagement data pertaining to interactions between a users and a flow of visual elements presented by a software product; — 402

Detect a trigger event indicative of customer dissatisfaction with the software product — 404

Responsive to detection of the trigger event, perform analysis on the engagement data — 406

Based at least in part on the analysis of the engagement data, identify a potential deficiency of the software product — 408

Generate a repair ticket that flags the potential deficiency of the software product for review by a development team — 410

FIG. 4

USE OF CUSTOMER ENGAGEMENT DATA TO IDENTIFY AND CORRECT SOFTWARE PRODUCT DEFICIENCIES

BACKGROUND

Various software as a service (SAAS) platforms support online distribution of software products and also offer technical support to customers using the software products. Depending on the breadth and capabilities of software products supported, the management of technical support teams can pose a major cost burden. In view of this, many companies are turning to more automated customer service approaches to reduce the burden on human operators, such as by implementing chatbots to field questions, posting answers to frequently-asked questions (FAQs), and distributing various self-help resources such as product use tutorials that include written content, video content, and/or interactive help content. Customers attempting to use these resources to resolve their own technical issues may feel frustrated and overburdened when such resources do not adequately address their concerns, ultimately turning to human support options when available.

Without quality feedback, customer service teams may find it very difficult if not impossible to improve the content of self-help resources that they provide. At the same time, however, customers who are already frustrated by technical problems may feel even more overburdened if prompted to provide explicit feedback pertaining to the deficiencies of the self-help resources that they attempt to use.

SUMMARY

According to one implementation, a disclosed method for generating passive customer feedback to improve a software product includes collecting engagement data pertaining to interactions of a customer with a flow of visual elements presented by the software product. The method further provides for identifying a location within the flow of visual elements for which the associated engagement data satisfies predefined criteria indicative of atypical customer behavior and analyzing content within the flow of visual elements corresponding to the identified location to identify a potential deficiency of the software product. Responsive to identifying the potential deficiency, a repair ticket is autogenerated to flag the potential deficiency for review by a developer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 4 illustrates example operations of a system that automatically generates passive feedback to notify a development team of potential deficiencies in a software product.

DETAILED DESCRIPTION

Figure 1:
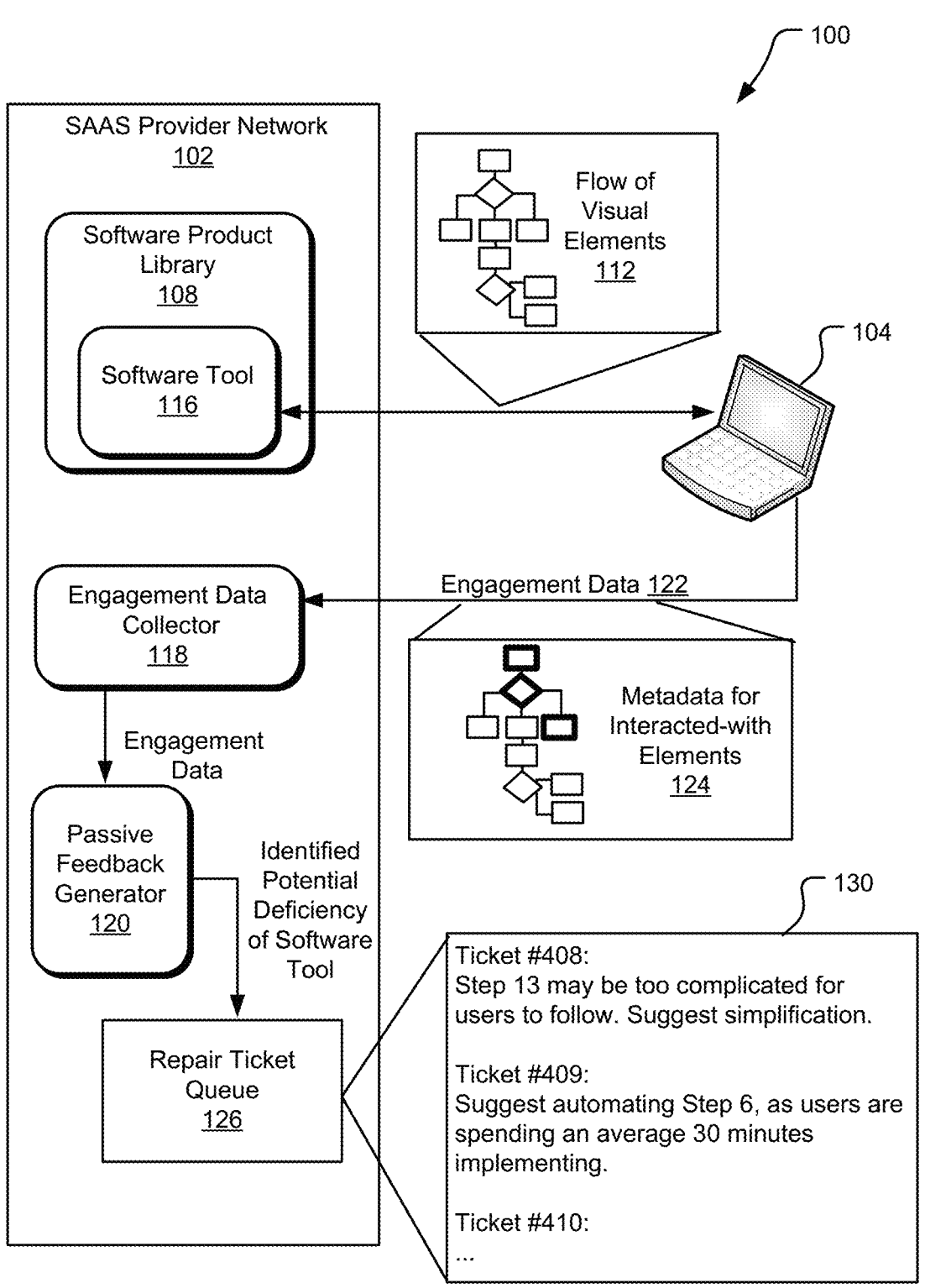
FIG. 1 illustrates an example system that uses customer engagement data pertaining to customer interactions with a software product to auto-diagnose and correct potential deficiencies of the software product.

The disclosed technology provides for automated flagging and reporting of potential deficiencies in software products. As used herein, "potential deficiency" refers to an inadequacy of a software product to with respect to a particular identified customer need or technical problem. In the primary use case considered, the software products are predeveloped help resources, such as diagnostic and debug tools, designed to provide technical assistance with respect to various specific issues. Notably, however, the herein disclosed methods are not limited to software products of this nature, and the same technology may be used to identify potential deficiencies in many different types of software products, particularly those that present guided content that a user interact with (e.g., by clicking, scrolling, or other action) to navigate through.

According to one implementation, the disclosed methods provide for collecting customer engagement data pertaining to interactions between a customer and a flow of visual elements presented by a software product. Engagement data includes, for example, click data that captures when and where a customer "clicked" with respect to content elements presented on a customer display as well as view time statistics indicating how long a customer viewed or interacted with different content elements presented on the display.

In one implementation, the collected engagement data is analyzed to identify "atypical customer behavior," which is defined herein as meaning customer behavior that is different from the behavioral pattern(s) that a developer of the software product would expect of satisfied customers having normal interaction with the software product. For example, atypical customer behavior may be characterized by a user spending 30 minutes on a slide or content item that has only a paragraph or two of text (e.g., much longer than it would take an average individual to actually read the text). In another example, atypical customer behavior is characterized by a large number of users aborting a current software product session at a common location within a flow of visual elements. In some cases, atypical customer behavior may be identified from analyzing data associated with a single customer (e.g., the customer's engagement data, system state data, and other inputs associated with the customer). In other cases, atypical customer behavior can be identified by collecting, aggregating, and analyzing data associated with many different customers.

Atypical customer behavior may be detected in various ways, such as applying hard-coded developer-defined rules or by training machine learning models to identify patterns in collected engagement data that are suggestive of particular types of software product deficiencies. In one implementation, a developer of the software product defines one or more hard-coded rules that, when satisfied, flag the instance as "atypical customer behavior" and trigger further logical analyses of the customer data that can provide contextual clues pertaining to the reasons a customer is dissatisfied with a software product. Likewise, machine learning models can similarly be employed to test various hypotheses pertaining to collected engagement data and content presented by a software product, such as to test whether there exist patterns within the collected engagement data that are inconsistent with normal use patterns (e.g., where "normal use" is defined either by use patterns consistent with a majority or other threshold percentage of users or instead by patterns consistent with use patterns of customers that did not experience technical problems or dissatisfaction when interacting with the software product).

Once an atypical customer behavior pattern is detected within a collected stream of engagement stream, the pattern can be auto-correlated with particular content item(s) that the customer was viewing at the time of the atypical behavior. In implementations where the software product presents a flow (e.g., defined sequence) of visual elements, it is possible for an algorithm or machine learning model to correlate the detected atypical customer behavior pattern with an identified location within the flow of visual elements. In this case, the presented content leading up to and including that identified location can be analyzed to diagnose a potential deficiency of the software product.

As is discussed in detail herein, various diagnostic techniques including developer defined rules and data-driven AI modeling can be employed to use the detected atypical customer use pattern and associated visually-rendered content to diagnose potential software product deficiency that is the catalyst for the identified atypical customer behavioral pattern. For example, algorithmic solutions and trained AI may be used to determine that a customer (or collection of customers) found a particular content item to be uninteresting, confusing, or irrelevant. In some cases, diagnosing a potential software product deficiency may depend upon further data inputs, such as details associated with an initial download of the software product, details associated with a customer support request submitted after using the software product, or state data pertaining to the physical configuration on the customer's machine. These and other scenarios are explored with respect to the following figures.

When a potential deficiency of a software product is diagnosed using the techniques disclosed herein, a repair ticket may be automatically generated and submitted to a developer. For example, the repair ticket may flag a particular content item as confusing, identify a particular error that customers are experiencing in association with the content item, or suggest that the software product be modified to include additional content that might help address an identified customer need that is unmet by the current version of the software product.

The collection and use of customer engagement data to auto-diagnose a software product deficiency amounts to a passive form of customer feedback that does not burden the customer and that is, in many cases, more "complete" (providing more insightful data) than what the feedback customer is likely to provide either verbally or within a comment box. For example, the disclosed techniques may be utilized to facilitate diagnostics based on engagement data patterns linked to specific content items viewed by the customer and/or to state data representing the physical state of the customer's machine before, after, and during the customer's interactions with the software product. Since this passive feedback data can be generated for virtually every single customer (and is not limited to a subset of customer that choose to explicitly provide such feedback), product deficiencies can be identified and corrected more quickly than by existing feedback systems that rely on explicit customer participation.

FIG. 1 illustrates an example system 100 that uses customer engagement data pertaining to customer interactions with a software product to auto-diagnose and correct potential deficiencies of the software product. The system 100 includes a software as a service (SAAS) network 102 managed by a SAAS provider that offers one or more software services to users (e.g., a user device 104). The offered software services are, in one implementation, stored on and executed by cloud-based resources. In one implementation, a user of the user device 104 accesses content of the SAAS provider network by logging into a personal account managed by the SAAS provider. Once the user's access credentials are authenticated by the SAAS provider network 102, the user device 104 is granted access to the various software services available on the SAAS provider network 102.

By example, the SAAS provider network 102 is shown to include a software product library 108. This software product library 108 includes various software products available for use to users that are logged into the SAAS provider network 102. The products within the software product library 108 may be cloud-executable products, products available for download and local execution on the user device 104, or some combination thereof. In the illustrated example, the user device interacts with a software tool 116 that, when executed, sequentially presents various elements in a defined flow of visual elements 114 to the display of the user device 104. As used herein, "flow of visual elements" refers to content items with a defined sequential presentation order. The user may be able to navigate through the content items by providing input, such as clicking, scrolling etc. The flow of visual elements 112 may include a single path with forward and backward representing the navigable directions or multiple paths defined by different decision forks such that the user's inputs dictate which path within the flow is presented to the user device 104.

In one implementation, the guided flow of visual elements 112 is a tutorial, where each element represents a different "step" that the user follows to perform some task. In another implementation, the guided flow of visual elements 112 include a series of steps in a given process that the user is trying to complete. In still other implementations, the guided flow of visual elements serve other purposes readily appreciable to those of skill in the art.

As the user interacts with the various content items in the flow of visual elements 112, the SAAS provider network 102 captures, at an engagement data collector 118, engagement data 122 pertaining to the user's interaction with each element. The engagement data 122 includes metadata identifying the elements within the flow that the user interacted with ("metadata for interacted-with elements 124") and also includes the associated engagement data pertaining to the user's interactions with each of the interacted-with elements 114 in the flow. For example, the metadata for each element includes how long the user viewed each element, where and when the user clicked on the various elements, and any other inputs that the user may have entered in association with each element.

The engagement data collector 118 provides the collected engagement data to a passive feedback generator 120 that performs a series of diagnostics to identify, based in part on the engagement data 122, a potential deficiency of the software product. Once identified, this potential deficiency is provided as feedback to a development team by way of a repair ticket that is automatically added to a repair ticket queue 126. The feedback is "passive" in the sense that the customer does not perform an affirmative action to convey the reason they are dissatisfied with the software product.

In one implementation, the passive feedback generator 120 performs diagnostics for a subset of users that subsequently report some dissatisfaction with either the software tool 116 or with an issue that the user acquired the software tool 116 to assist with. For example, the user may provide the SAAS provider network 102 with other engagement data related to the software tool 116, such as by providing a negative rating (e.g., "dislike," "thumbs down," one out of five stars) through a rating system of the SAAS provider network 102. Responsive to receipt of the negative rating from the user, the passive feedback generator 120 can analyze the engagement data 122 for the user in an effort to determine why the user was dissatisfied.

In another implementation, the software tool 116 is a tool for debugging a particular type of technical problem. The user downloads the software tool 116 from the SAAS provider network 102 and subsequently (after using the software tool 116) opens a help support ticket to request human assistance with a technical problem of the type that the software tool 116 is designed to assist with. From the data of these two user actions (e.g., downloading the tool and subsequently opening the help support ticket), the passive feedback generator 120 may infer that the software tool 116 did not solve the technical problem the customer was having and analyze the customer's engagement data with the software tool 116 in an effort to identify a root cause of the customer's dissatisfaction with the software tool 116 (e.g., a potential deficiency of the software product). In various implementations, the passive feedback generator 120 analyzes the customer's engagement data 122 alone or in the aggregate with similar data collected from other customers and in combination with the content of flow of visual elements 112 and/or with other available contextual data, such state data of the customer's system detectable by the SAAS provider network 102, content of the help support request, and other user-provided inputs related to the software tool 116 and/or the user's reason for accessing the software tool 116.

Based on the above diagnostics that are based, at least in part, on the engagement data 122, the passive feedback generator 120 identifies a potential deficiency of the software tool 116 and automatically creates a repair ticket item (e.g., ticket #408, ticket #409 in view 130) that is added to a repair ticket queue 126. A first example repair ticket item (ticket #409) in the repair ticket queue 126 indicates "Step 13 may be too complicated for users to follow. Suggest simplification." This potential deficiency in step 13 of the flow of visual elements 112 may, for example, be identified when aggregated engagement data from multiple customers indicates that a large percentage of the customers are exiting the software tool 116 (aborting the active process(es)) at Step 13.

Another example repair ticket item (ticket #410) indicates "Suggest automating step 6, as users are spending an average of 30 minutes implementing." This potential deficiency in step 6 may be identified from an analysis of aggregated engagement data collected indicates that customers are spending a particularly long time on step 13 in view of a static or dynamically determined threshold (e.g., an expected time per-word presented to the user display at the corresponding step in the flow of visual elements 112).

Figure 2:
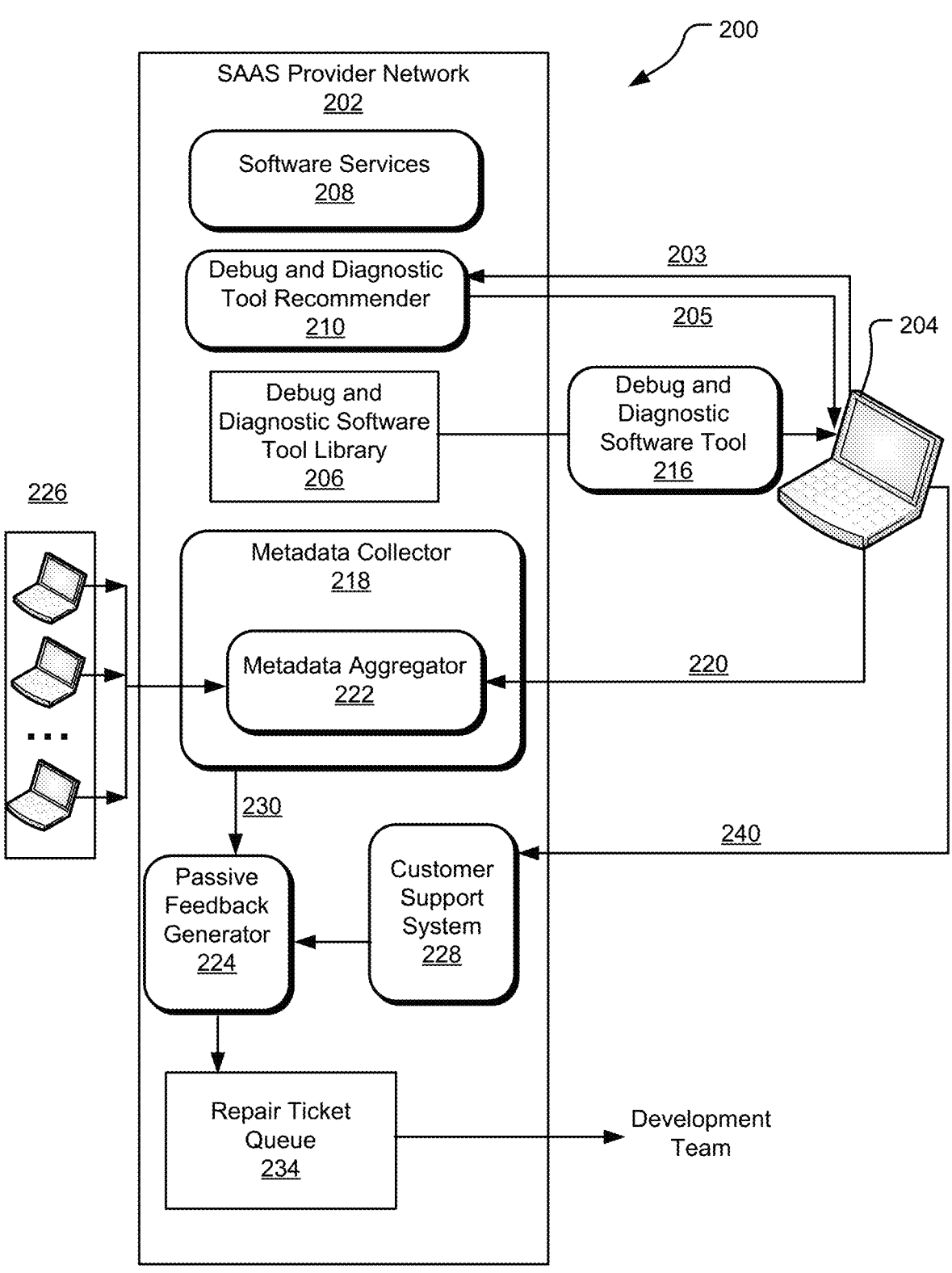
FIG. 2 illustrates another example system that uses customer engagement data pertaining to customer interactions with a software product to auto-diagnose and correct potential deficiencies of the software product.

FIG. 2 illustrates another example system 200 that uses customer engagement data pertaining to customer interactions with a software product to auto-diagnose and correct potential deficiencies of the software product. Like the system of FIG. 1, the system 200 includes a SAAS provider network 202 that offers various software services 208 to customers with accounts on the network. To reduce the burden on human technical support assistants, the SAAS provider network 202 provides a debug and diagnostic tool recommender 210 that recommends tool(s) to a user (e.g., of user device 204) from a debug and diagnostic software tool library 206 in response to inputs that the user provides.

If, for example, the user is looking for a resource on debugging a certain feature of one of the software services 208, the user may provide inputs 203 to the debug and diagnostic tool recommender 210 and, in response, receive outputs 205 that guide the user to an appropriate tutorial on the feature of interest. The user-provided inputs may, for example, identify the software service and feature(s) of interest as well as general details of a particular technical issues that the user is hoping to troubleshoot. Inputs provided to the debug and diagnostic tool recommender 210 may be saved by the system 200 and subsequently used by a passive feedback generator 224 (discussed below) to help diagnose deficiencies with the debug and diagnostic software tool 216 that is recommended to the user and subsequently used by the user.

While the user interacts with the debug and diagnostic software tool 216, a metadata collector 218 collects metadata 220 from the user's system. The metadata 220 includes engagement data pertaining to the user's interactions with various content elements in a flow of visual elements presented by the debug and diagnostic software tool 216 (e.g., as described with respect to FIG. 1) and in some implementations also includes system state data of the user's device, such as a current configuration of the user device 204 as well as well as configurations and settings of each of the software services 208 being executed in association with the user device 204, and actions the user has recently taken (e.g., to alter various settings and configurations of the user device). In FIG. 2, the metadata collector 218 includes a metadata aggregator 222 that aggregates metadata of the same or similar types collected from other users 226 that have also used the debug and diagnostic software tool 216.

The metadata 220 of the user and/or the aggregated metadata of the many users 226 is provided as input metadata 230 to a passive feedback generator 224. When the passive feedback generator 224 subsequently receives an indication that the user of the debug and diagnostic software tool 216 is dissatisfied with product, the passive feedback generator 224 performs a series of diagnostics in an effort to passively identify (without additional user input) the root cause of the customer's dissatisfaction with the debug and diagnostic software tool 216.

In FIG. 2, the diagnostic analysis of the passive feedback generator 224 is triggered when the user provides inputs 240 to a customer support system 228 indicating that the customer's technical problem is unresolved. For example, the user may open a help support ticket with the customer support system by entering text into an online form, making a phone call to a help operator, or other action. A help ticket is then created either by software of the customer support system 228 or by a human operator. The customer support system 228 provides the passive feedback generator 224 with content included in the help ticket, such as user-identifying information and/or customer-provided information describing the technical problem.

In one implementation, passive feedback generator 224 adds the metadata 220 of the user to a body of data to be analyzed (or begins its analysis on such data) when the user contacts the customer support system 228 within a set time period after utilizing the debug and diagnostic software tool 216. For example, if the two actions occur on the same day or within a few days of one another, it may be assumed that the customer support request is related to the same issue that that prompted the user to search for and download the debug and diagnostic software tool 216. In this case, the fact that the user contacted the customer support system 228 after using the debug and diagnostic tool 216 is evidence that the debug and diagnostic software tool 216 did not adequately resolve the user's concern or technical problem.

In another implementation, the passive feedback generator 224 receives and analyzes the inputs that the user provides to the customer support system 228 and, from this, infers that the technical problem described in the user's help support request is of a same type of problem that the debug and diagnostic software tool 216 is designed to address. For this, it can be inferred that the user executed the debug and diagnostic tool in an effort to resolve the technical problem and did not succeed at resolving the technical problem. This scenario may also serve as a trigger event for adding the metadata 220 of the customer to a body of data that is analyzed by the passive feedback generator 224.

In another implementation, the passive feedback generator 224 begins its analysis responsive to some other type of trigger event indicating that the customer is dissatisfied with the debug and diagnostic software tool 216. For example, the user may provide a negative engagement signal, such as a "dislike" indication or a rating of "one out of five stars," and this negative engagement signals serves as an indication of customer dissatisfaction that triggers an analysis of the metadata 220 of the user by the passive feedback generator 224.

In each of the above scenarios, the passive feedback generator 224 analyzes the metadata 220 of the customer in response to some affirmative input provided to a component on the SAAS provider network 202 following use of the debug and diagnostic software tool 216. The affirmative input is indicative of an unresolved technical problem that is, in some way, linked to the user's motivation for utilizing the debug and diagnostic software tool 216.

In response to any of the trigger events described above, the passive feedback generator 224 performs an analysis the same or similar to that described with respect to the passive feedback generator 120 of FIG. 1 to identify a potential deficiency with the debug and diagnostic software tool 216 that is responsible for the user's dissatisfaction with the tool (e.g., the deficiency being a reason "why" the tool did not adequately address the user's problems, topics of interest, or concerns). In some implementations, the passive feedback generator 224 performs a batch analysis on the metadata 220 that has been aggregated from several different users that interacted with the debug and diagnostic software tool 216.

Once the potential deficiency with the debug and diagnostic software tool 216 has been identified, the passive feedback generator 224 generates a repair ticket item that identifies the potential deficiency. This repair ticket is added to a repair ticket queue 234 that is pushed to member(s) of a development team who may, in turn, act quickly to modify and improve the debug and diagnostic software tool 216 to address the identified product deviancies without a need for any additional user input.

Figure 3:
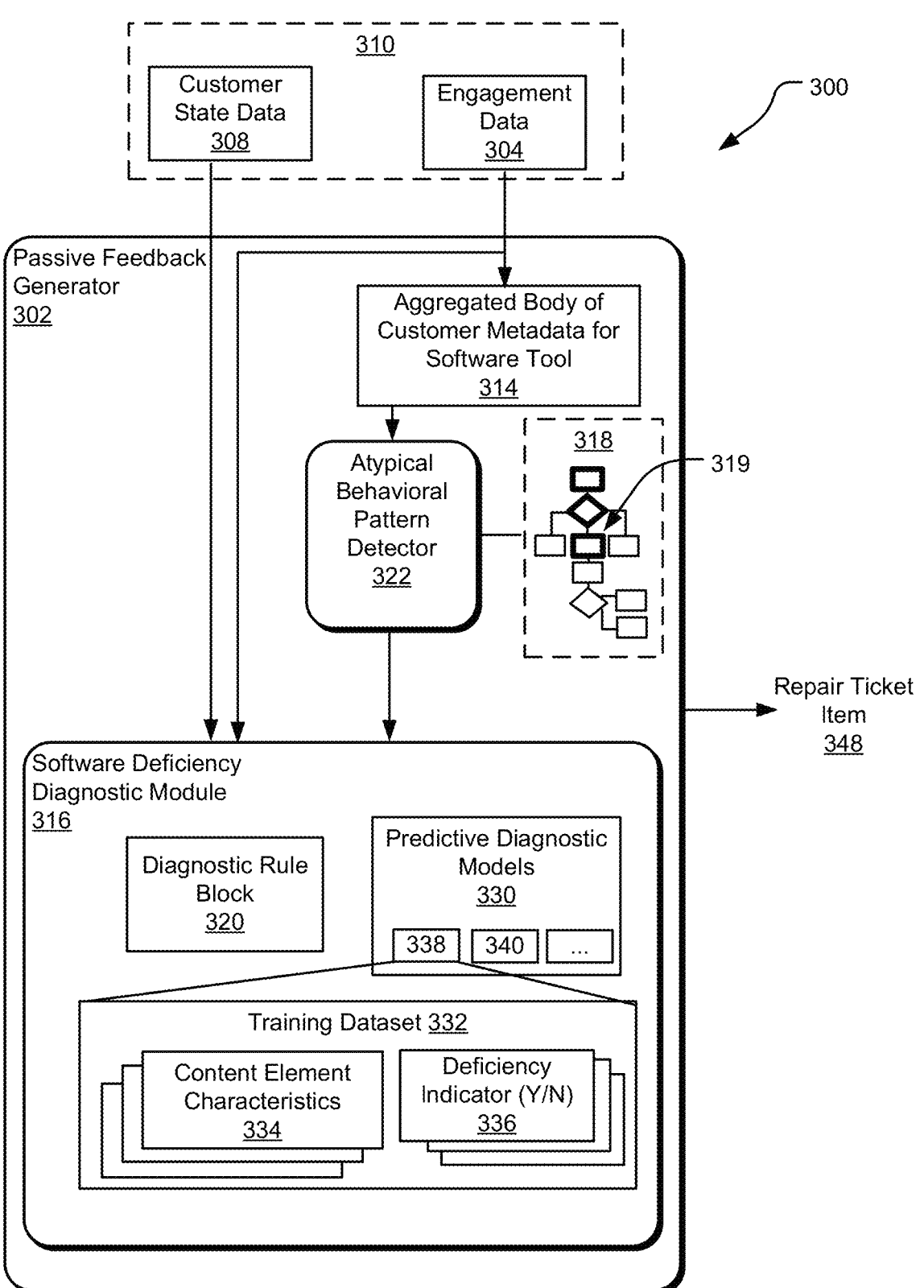
FIG. 3 illustrates aspects of a system that includes a passive feedback generator that generates feedback for improving a software product based on engagement data collected from customers interacting with the software product.

FIG. 3 illustrates aspects of a system 300 that includes a passive feedback generator 302 that offers functionality that is the same or similar to that described with respect to the passive feedback generators described with respect to FIGS.

1 and 2. In one implementation, the passive feedback generator 302 is incorporated into a system that includes components the same or similar to those shown in FIGS. 1 and 2.

The passive feedback generator 302 implements logic that may, in various implementations, predefined rules within a diagnostic rule block 312 and/or employ various trained machine learning models to test hypotheses related to potential product deficiencies that may be detectable by analyzing characteristics of customer metadata collected in association with use of a software product (not shown). The elements shown and described with respect to FIG. 3 may be used in combination, independently, and/or in combination with other diagnostic tools not described herein.

The passive feedback generator 302 receives customer metadata related to use of a particular software product. In FIG. 3, this customer metadata includes both customer state data 308 (e.g., configuration data pertaining to the user's machine and connections to a given network) as well as engagement data 304 pertaining to the customer's specific interactions with various content items in a flow of visual elements presented to the customer by the software product (e.g., click time, view time in association with each element, and the visual characteristics of each element in the flow of visual elements 318 presented by the software product). In some implementations, the customer metadata 310 includes additional information, such as information that the customer provided to the system 300 pertaining to reason(s) for using the software product (e.g., information provided to the debug and diagnostic tool recommender 210 of FIG. 2) and/or information provided in connection with concerns or technical problems reported by the customer, such as in connection with a technical support request.

In one implementation, the customer metadata 310 is provided to the passive feedback generator 302 in response to a trigger event indication potential user dissatisfaction with the software product. For example, the user may provide a negative engagement signal in association with the product (e.g., dislike, low star rating) or open a help support ticket within a set period of time after downloading and/or interacting with the software product. In some implementations, the trigger event may occur when the user opens a help support request that includes certain semantic information that can be associated, by a natural language processing model, with terms included in a description of the software product that the user previously interacted with.

When the trigger event is detected, the customer metadata 310 is added to the aggregated body of customer metadata for the software tool 314. An atypical behavioral pattern detector 322 analyzes batches of the aggregated metadata in an effort to identify patterns satisfying predefined criteria that are determined to be indicative of atypical customer behavior, such as patterns that satisfy human-specified criteria or criteria that has been learned, by a machine learning model, as being characteristic of a particular behavior inconsistent with that expected by a customer dissatisfied with a software product for various reasons.

In one implementation, the atypical behavioral pattern detector 322 flags location(s) (e.g., a location 319) within in a visual flow of elements 318 of the software product that are characterized by anomalous average interaction times (one example of an atypical customer behavioral pattern). An anomalous average interaction time is an average interaction time with a content element characterized by a customer interaction (e.g., view time) that is longer or shorter than an expected threshold, such as a threshold that is developer-specified or intelligently set based on the amount of textual content presented by the content element. If, for example, 40% of customers represented within the dataset are spending 30+ minutes on a particular content item that includes two short instructions (e.g., instructions for configuring the customer device, capturing a diagnostic, or debugging a configuration), this may indicate that there is some type of a problem with those instructions. Alternatively, if a large percentage of users are spending 30 seconds or less reviewing a content element that includes 4 paragraphs of text, this may be a sign that the customers are not actually reading the content for some reason. In another implementation, the atypical behavioral pattern detector 322 determines that a significant subset of the customers are aborting the software product after reaching a particular location in the visual flow of elements that is not a natural endpoint of the flow. For example, the "abort" location represents an interim step in a how-to tutorial. This is an indication that there may be a deficiency in content presented at this location in the flow of elements.

The above-described and other similarly-detectable atypical customer behavioral patterns can each be associated, within the aggregated customer engagement data, with a specific identified location in the flow of visual elements presented by the software product. For example, a last-interacted with item or an item characterized by an anomalous average interaction time may be flagged as having a potential deficiency.

In some cases, the passive feedback generator 302 generates passive feedback about a potential deficiency of the software product response to receiving outputs for the atypical behavioral pattern detector 322 (e.g., responsive to identification of an atypical behavioral pattern and a corresponding location within the flow of visual elements 318). For example, the passive feedback generator 302 may generate a repair indicating a potential deficiency with an element in the flow of visual elements 318 that represents either a last-interacted-with element for group of users or that is characterized by an anomalous average customer interaction time for a group of users. For example, the passive feedback generator 302 may output a repair ticket item 348 that states: "30% of customers aborted sequence at step 12. Suggest revising step 12 for clarity."

In some implementations, the passive feedback generator 302 performs further diagnostics to determine a more specific cause of a detected atypical customer behavioral pattern. In FIG. 3, this additional analysis is represented by a software deficiency diagnostic module 316. The software deficiency diagnostic module 316 may explore possible causes of the detected atypical behavioral pattern by applying predefined rules in a diagnostic rule block 320 and/or by executing one or more predictive diagnostic models 330 that employ machine learning techniques to test various hypotheses.

Assume, for example, that a detected atypical behavioral pattern indicates that a significant subset of customers represented within the dataset aborted the flow of visual elements at an unexpected location (not a natural endpoint) corresponding to a particular content element. There are several possible explanations for this including (1) the customer lost interest because the content element was too lengthy or uninteresting; (2) the customer gave up because the content element included instructions that were too confusing to follow; (3) the customer decided that the software product was not pertinent to the customer's initial motivation for executing the software product.

Each of the above possible explanations can be tested in different ways. In one implementation, one or more rules within the diagnostic rule block 320 are applied to test whether the content element is too lengthy or uninteresting. For example, various predefined rules may be used to check for possible presentation deficiencies pertaining to content quantity (e.g., too much content presented at once), font (e.g., difficult to read), size (e.g., too small to hold attention), or color (e.g., not enough contrast, hard to see). A machine learning model can be utilized for the same or similar purpose. For example, the machine learning model 338 may be trained on a training dataset 332 including content element characteristics 334 of content elements for which various customers rated as either confusing or not confusing (as indicated by deficiency indicator 336, representing a Y/N value).

Likewise, other rules the diagnostic rule block 320 and/or other models of the predictive diagnostic models 330 may be employed to test an extensive number of hypothesis providing potential reasons for observed atypical customer behavior.

In one implementation, predictive diagnostic models 330 include a model 340 designed to test whether the software product failed to address a particular customer concern. For example, the model 340 may be a natural learning model that identifies semantic associations (and semantic discrepancies) between (1) customer-provided data indicative of customer motivations and/or technical problems; and (2) content in the flow of visual elements 318. For example, the model 340 may accept as input a text string for each customer that includes one or more of: (1) customer inputs provided to the system 300 in association with the customer's initial download of the product; (2) customer inputs provided to the system after using the product (e.g., content included in a help support request); and (3) a textual description of the product and/or content included within the particular content items within the sequence of visual elements 318 that the customer interacted with.

From the above information, the model 340 may be able to extract particular characteristics of the customer's motivation for using the software product or characteristics of a technical problem the customer is having. The model can then compare these extracted characteristics relating to the customer motivation with characteristics similarly extracted from the flow of visual elements 318 to identify a degree of relevancy between the two sets of characteristics, thereby indirectly quantifying how relevant the content items presented by the software product are to the customer's motivation for using the software product. For example, the model 340 may determine that a high percentage of users searching a product database for "help with feature [X]" are downloading the software product and then subsequently opening help support tickets for assistance with feature [X]. In this case, the model can logically infer that the software product does not provide adequate assistance for feature [X], and the passive feedback generator 302 may generate a repair ticket item suggesting that the software product be modified to better address feature [X] or otherwise be excluded from system recommendations made to users looking for help with feature [X].

The above scenario could likewise be addressed by way of other types of logic that determines, from content of a customer support request (or many such requests), characteristics of a technical problem reported by one or more customers and by searching content within the flow of visual elements for references to the characteristic(s) of the technical problems, such as by parsing the content items and using natural language processing to identify semantic associations between text included within the content items and extracted characteristics (e.g., text) of a customer support request. Responsive to determining that the flow of a visual elements does not include a reference to one or more of the identified characteristics of the customer's technical problem, the passive feedback generator 302 may generate a repair ticket indicating the software product is potentially deficient for failing to address the particular problem and/or the particular customer-specified characteristic of the problem.

For example, the user may open a help request indicating that they are seeing a "403" error in response to performing a particular configuration action that is also addressed in an interactive tutorial presented by a software product the customer accessed. The passive feedback generator 302 may determine that the interactive tutorial does not address the 403 error in association with the particular user-specified configuration action and generate a repair ticket that identifies a failure to address the 403 error as a potential deficiency in the software product.

In some implementations, the passive feedback generator 302 does not include the atypical behavioral pattern detector 322 of FIG. 3. Rather, the customer metadata 310 for an individual customer or group of customers is provided directly to one or predictive diagnostic models 330 that have been trained to correlate characteristics within the customer metadata 310 (e.g., the engagement data, specific content items that the user interacted with, customer state data 308, or other system data pertinent to the customer's motivation for using the software product) with one or more preidentified potential deficiencies of the software product.

In still other implementations, the predictive diagnostic models 330 may generate repair ticket items based on the customer state data 308, such as by identifying a particular customer problem (e.g., from content of a help support request) and the associated significance of changes made to the customer configuration before and after the customer interacted with the software product and/or before and after a customer's interaction with a customer support representative. For example, configuration changes made in connection with the customer's use of the software product can be identified as changes that likely did not address the customer's problem if the customer subsequently placed a customer support request. In contrast, configuration changes made in connection with a user's session with a customer support representative can be identified as changes that may be useful in addressing the problem that the software product did not resolve for the customer. This diagnostic can, in turn, be captured in the corresponding repair ticket item 348 generated by the passive feedback generator 302.

FIG. 4 illustrates example operations 400 of a system that automatically generates passive feedback to notify a development team of potential deficiencies in a software product. The passive feedback is generated based on the interactions of users with a visual flow of elements presented by the software product and without any affirmative feedback action performed by users.

An engagement data collection action 402 collects engagement data pertaining to the interactions between each of multiple users and the software product, such as click data, view time, and other metadata indicating the content included within each of the presented elements that the users interact with. In some implementation, the operations 400 further provide for collecting other types of data, such as customer state data pertaining to configurations of the customer device as well as various available types of data associated with a user's interactions with a software product or with a user's motivation for utilizing the software product (e.g., data provided in connection with initial acquisition or execution of the software product, data provided to a customer support system after interacting with the software product).

A detection operation 404 detects a trigger event indicative of customer dissatisfaction with the software product. In different implementations, the trigger event may assume different forms. For example, the trigger event may be detected when a user provides a negative rating in association with the software product or when the user opens a help support ticket following use of the software product, such as when the help support ticket is opened within a predefined time interval following use of the software product.

Responsive to detection of the trigger event, an analysis operation 406 perform an analysis on the engagement data to identify signatures satisfying predefined criteria that are determined to be indicative of atypical customer behavior. In some implementations, the analysis operation 406 entails identifying a signature of atypical customer behavior that repeatedly appears in the engagement data of different customers that interacted with a same software product (e.g., a pattern in the aggregated engagement data). For example, a particular content may be characterized, within its associated engagement data, by an anomalous average interaction time (higher or lower than a threshold). Signatures or patterns of atypical customer behavior can be linked to particular content elements presented by the software product, and the analysis operation 406 may further entail analyzing those particular content elements—either alone or in conjunction with other types of collected data—to identify a potential deficiency within the content elements or that arises in relation to the those content elements (e.g., the content element is itself deficient because it is unclear/confusing or the user experiences a certain error when performing a particular operation that is instructed by one of the content elements).

In various implementations, the analysis operation 406 may provide for executing one or more machine learnings models trained to correlate particular characteristics observable within the customer engagement data and/or other collected system data (as described above) with one or more different types of software product deficiencies.

At the conclusion of this analysis, an identifying operation 408 identifies a potential deficiency of the software product. A ticket generation operation 410 generates a repair ticket that flags the identified potential deficiency of the software product for review by a development team.

Figure 5:
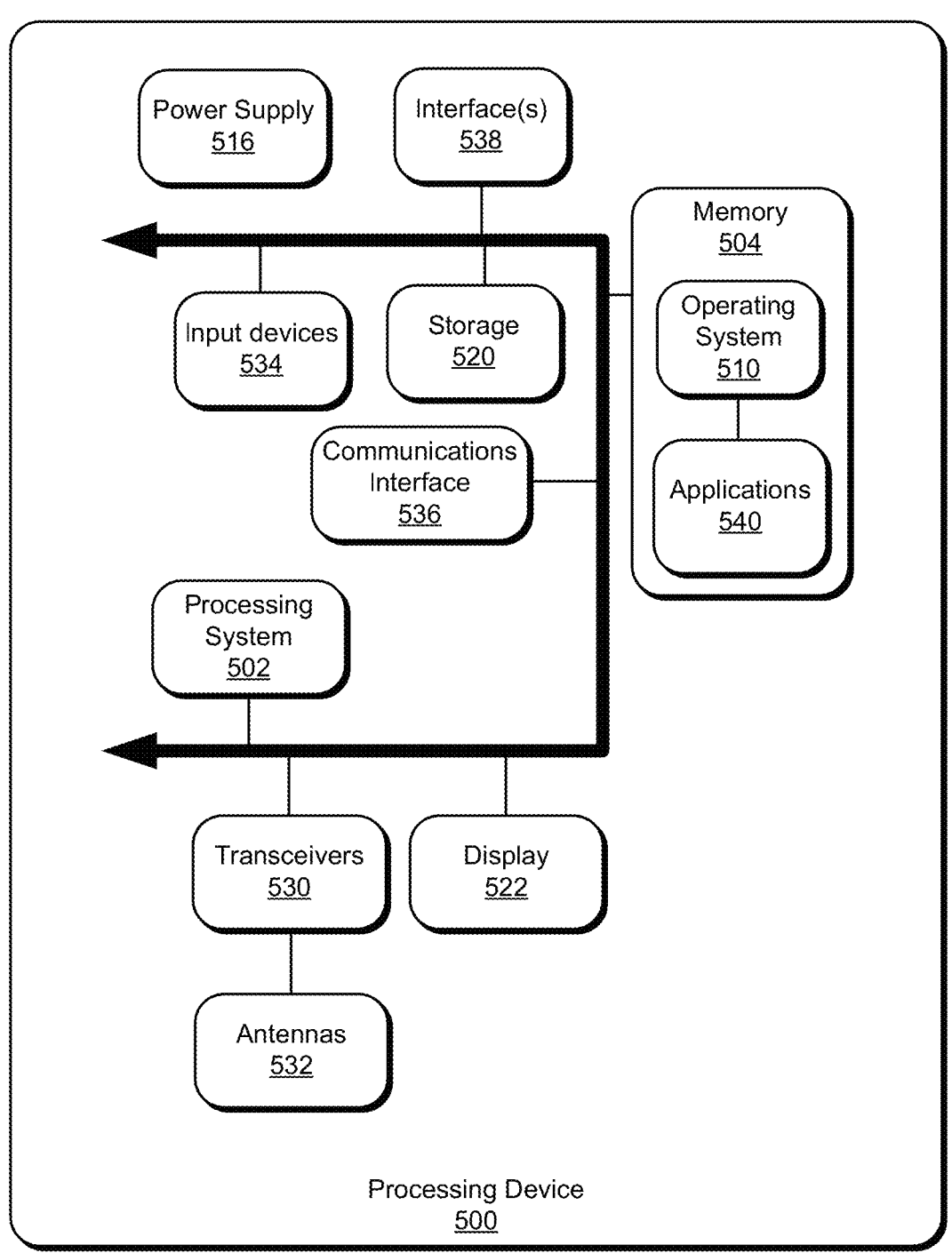
FIG. 5 illustrates an example schematic of a processing device suitable for implementing aspects of the disclosed technology

FIG. 5 illustrates an example schematic of a processing device 500 suitable for implementing aspects of the disclosed technology. In one implementation, the processing device 500 is a user device that interacts with SAAS-provided software product. While the user is interacting with the software product, engagement data and other user metadata are collected from the user's machine. When the user reports a dissatisfaction with the software product, the collective user metadata is analyzed and used to provide passive customer feedback that identifies a potential deficiency of the software product for a development team.

The processing device 500 includes a processing system 502, memory device(s) 504, the display 506, and other interfaces 508 (e.g., buttons). The memory device(s) 504 generally includes both volatile memory (e.g., RAM) and non-volatile memory (e.g., flash memory). An operating system 510 may reside in the memory device(s) 504 and be executed by the processing system 502. One or more applications 512, such as an engagement data collector, metadata collector, passive feedback generator or other components of a SAAS provider network (e.g., SAAS provider networks 102 of FIG. 1 and 202 of FIG. 2) may be loaded in the memory and executed on the operating system 510 by the processing system 502.

The processing device 500 includes a power supply 516, which is powered by one or more batteries or other power sources and which provides power to other components of the processing device 500. Additionally, the processing device 500 includes one or more communication transceivers 530 and an antenna 532 to provide network connectivity (e.g., a mobile phone network, Wi-Fi®, BlueTooth®). The processing device 500 may be further coupled to various input devices 534 such as a microphone, keyboard, touch display, etc. In an implementation, an installation script generation engine, along with other various applications and other modules and services, are embodied by instructions stored in memory device(s) 504 and/or storage devices 528 and processed by the processing system 502. The memory device(s) 504 may be memory of host device or of an accessory that couples to a host. The installation script generation engine my include a trained multi-layer neural network that is saved in the memory device(s) 504 or saved in memory of one or more other compute devices (e.g., various interconnected processing nodes) that are communicatively coupled to the processing device 500, such as via the internet.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth.

Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The following summary provides a non-exhaustive set of illustrative examples of the technology set forth herein. (A1) According to a first aspect, some implementations include a method for generating passive feedback to improve a software product. The method includes collecting engagement data pertaining to interactions between a customer and a flow of visual elements presented by the software product, identifying a location within the flow of visual elements for which the associated engagement data satisfies predefined criteria indicative of atypical customer behavior, analyzing content within the flow of visual elements corresponding to the identified location to identify a potential deficiency of the software product, and autogenerating a repair ticket to flag the potential deficiency for review by a developer.

The method of A1 is advantageous because it provides for auto-generation of feedback of the type that could be provided by a customer and is based on the customer's experience with the software product, without requiring any affirmative feedback action on behalf of the customer.

(A2) In some implementations of A1, the software product is a debug and diagnostic software tool and the method further comprises: receiving a first indication that the customer has experienced a particular technical problem, determining that the customer has used the debug and diagnostic software tool in an effort to address the particular problem; and receiving a second indication that the customer is dissatisfied with the debug and diagnostic software tool in relation to the particular technical problem. The identifying of the location and analyzing the content occur in response to receipt of the second indication.

The method of A2 is advantageous because it provides for identification of a narrow subset of customer product interaction instances for which the customer was dissatisfied prior to performing the more processor-intensive operations of A1. This allows for significant power resource saving (e.g., by not analyzing the engagement data collected from customers who were not dissatisfied with the software product).

(A3) In some implementations of A1 or A2, receiving the second indication further includes receiving a support ticket request opened by the customer.

The method of A3 is advantageous because it provides a concrete non-subjective criteria identifying which customers are dissatisfied with a software product without burdening the customers with requests for feedback.

(A4) In some implementations of A1-A3, the method further comprises receiving a report of a technical problem encountered by a customer and recommending, based on content of the report, a debug and diagnostic software tool to help the customer resolve the problem. The software product is the debug and diagnostic software tool and collecting the engagement data further comprises collecting engagement data pertaining to customer interactions with the debug and diagnostic software tool.

The method of A4 is advantageous because this data collection from the customer prior to the customer's interaction with the software product can be helpful in the auto-identification (e.g., by AI) of a customer motivation for using the software product and, ultimately, of value when subsequently assessing why the customer was dissatisfied with the software product (e.g., it did not help the customer with the problem that the customer was hoping to solve).

(A5) In some implementations of A1-A4, the method further comprises collecting and aggregating the engagement data for a group of customers interacting with the software product and identifying the location further comprises identifying a visual element within the flow of elements that is characterized, within the engagement data, by an anomalous average interaction time, wherein the repair ticket identifies a potential deficiency with the visual element.

(A6) In some implementations of A1-A5, the method further comprises analyzing content within the flow of visual elements further comprises collecting and aggregating the engagement data for a group of customers interacting with the software product, and identifying the location further comprises identifying an element in flow of visual elements corresponding to a last-interacted-with element for a subset of the customers, wherein the repair ticket identifies a potential deficiency with the last-interacted with element.

The methods of A5 and A6 are advantageous because aggregating data from multiple customer prior to analysis can allow for identification of trends in customer behavior indicative of a deficiency with the product that is affecting many customers in the same or similar way.

(A7) In some implementations of A1-A6, the method further comprises receiving a request for technical support from the customer; automatically determining, from content of the request, a characteristic of a technical problem identified by the customer; searching content within the flow of visual elements for a reference to the characteristic of the technical problem; and determining that the flow of visual elements does not include a reference to the characteristic of the technical problem. In these implementations, the repair ticket indicates that the debug and diagnostic software tool is deficient for failing to reference the characteristic of the technical problem reported by the customer.

(A8) In some implementations of A1-A7, the method further comprises providing the collected engagement data to a machine learning model trained to test for a particular type of software product deficiency based on a training data set that includes engagement data collected from other customers pertaining to interactions with one or more additional software products. The method additionally comprises receiving, as output from the machine learning model, a prediction of whether or not the particular type of software product deficiency is a cause of a dissatisfaction reported by the customer.

(A9) In some implementations of A1-A8, the method further comprises determining the customer subsequently received assistance with the software product from a human operator; analyzing state data received from a computer of the customer; detecting, based on the analyzing of the state data, system alterations to the computer that occurred during a time interval corresponding to a time in which the customer received the assistance from the human operator; and automatically analyzing the visual elements in the flow for reference to the detected system alterations. In these implementations, the repair ticket indicates that the software product is deficient for failing to address the system alterations.

The method of A9 advantageously utilizes other metadata of the customer computer system to provide context pertaining to the customer's potential technical problem and/or source of dissatisfaction with the software product.

In another aspect, some implementations include a computing system for automatically generating passive feedback to improve a software product based at least in part on engagement data collected pertaining to a customer's interactions with the software product. The computer system includes hardware logic circuitry that is configured to perform any of the methods described herein (e.g., A1-A9). In yet another aspect, some implementations include a computer-readable storage media for storing computer-executable instructions. The computer-readable instructions, when executed by one or more hardware processors, perform any of the methods described herein (e.g., A1-A9).

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method for generating passive feedback to improve a software product, the method comprising:

determining at each of a plurality of customer devices and by a processor that tracks quantities of time a user has spent interacting with various different elements of a flow of visual elements presented by the software product;

collecting, by the plurality of customer devices, engagement data pertaining to interactions between customers and the flow of visual elements presented by the software product, the engagement data indicating quantities of time that users have spent interacting with different elements within the flow of visual elements;

aggregating the engagement data to create aggregated engagement data;

detecting, by a first machine learning model, a pattern in the aggregated engagement data that has been learned by the first machine learning model as being indicative of atypical user behavior and inconsistent with patterns associated with behavior expected from customers satisfied with the software product, the pattern corresponding to a location within the flow of visual elements;

in response to detecting the pattern, identifying a potentially deficient content item by correlating the location within the flow of visual elements with a particular content item viewed at a time of the atypical user behavior;

in response to identifying the potentially deficient content item, determining a reason for the atypical user behavior by providing the potentially deficient content item to a second machine learning model trained to detect a predefined type of content deficiency, the second machine learning model trained on content elements and user ratings of the content elements;

receiving an output from the second machine learning model indicating that the potentially deficient content item is characterized by the predefined type of content deficiency, and in response to receiving the output from the second machine learning model, autogenerating a repair ticket for review by a developer, the repair ticket identifying the potentially deficient content item and the predefined type of content deficiency identified by the second machine learning model.

2. The method of claim 1, wherein the software product is a debug and diagnostic software tool and the method further comprises:

receiving a first indication that a customer has experienced a particular technical problem;

determining that the customer has used the debug and diagnostic software tool in an effort to address the particular technical problem; and receiving a second indication that the customer is dissatisfied with the debug and diagnostic software tool in relation to the particular technical problem, wherein identifying the location occurs in response to receipt of the second indication.

3. The method of claim 1, wherein the pattern is indicative of an average user interaction time that is of atypical length or a tendency to abort the flow of visual elements at a location that is not a natural endpoint.

4. The method of claim 1, further comprising:

receiving a report of a technical problem encountered by a customer; and recommending, based on content of the report, a debug and diagnostic software tool to help the customer resolve the technical problem, wherein the software product is the debug and diagnostic software tool and collecting the engagement data further comprises:

collecting engagement data pertaining to customer interactions with the debug and diagnostic software tool.

5. The method of claim 1, wherein identifying the location further comprises identifying a visual element within the flow of elements that is characterized, within the aggregated engagement data, by an anomalous average interaction time, wherein the repair ticket identifies a potential deficiency with the visual element.

6. The method of claim 1, wherein identifying the location further comprises identifying an element in the flow of visual elements corresponding to a last-interacted-with element for a subset of the customers, wherein the repair ticket identifies a potential deficiency with the last-interacted-with element.

7. The method of claim 1, further comprising:

receiving a request for technical support from a customer;

automatically determining, from content of the request, a characteristic of a technical problem identified by the customer;

searching content within the flow of visual elements for a reference to the characteristic of the technical problem; and determining that the flow of visual elements does not include the reference to the characteristic of the technical problem, wherein the repair ticket indicates the flow of visual elements is deficient for failing to reference the characteristic of the technical problem reported by the customer.

8. The method of claim 1, further comprising:

determining that a customer of the software product subsequently received assistance with the software product from a human operator;

analyzing state data received from a computer of the customer;

detecting, based on the analyzing of the state data, system alterations to the computer that occurred during a time interval corresponding to a time in which the customer received the assistance from the human operator; and automatically analyzing the visual elements in the flow for reference to the detected system alterations, wherein the repair ticket indicates that the software product is deficient for failing to address the system alterations.

9. An automated system for identifying a root cause of customer dissatisfaction with a software product, the automated system comprising:

an engagement data collection tool stored in memory that collects engagement data pertaining to interactions between a customer and a flow of visual elements presented by the software product, wherein collecting the engagement data entails using a processor to track quantities of time a user has spent interacting with different elements within the flow of visual elements and the engagement data indicates the quantities of time that the user has spent interacting with the different elements;

a passive feedback generator stored in memory that automatically:

creates aggregated engagement data by aggregating the engagement data collected from a plurality of customer devices;

analyses the aggregated engagement data to detect a pattern in the aggregated engagement data corresponding to a location within the flow of visual elements, the pattern being indicative of an atypical user behavior;

in response to detecting the pattern, identifies a potentially deficient content item by correlating the location within the flow of visual elements with a particular content item being viewed at a time of the atypical user behavior;

in response to identifying the potentially deficient content item, determines a reason for the atypical user behavior by providing the potentially deficient content item to a first machine learning model trained to detect a predefined type of content deficiency;

receives an output from the first machine learning model indicating that the potentially deficient content item is characterized by the predefined type of content deficiency; and in response to receiving the output from the first machine learning model, autogenerates a repair ticket for review by a developer the repair ticket identifying the potentially deficient content item and the predefined type of content deficiency identified by the first machine learning model.

10. The automated system of claim 9, wherein the system is further configured to perform operations comprising:

receiving a report of a technical problem encountered by the customer;

recommending, based on content of the report, a debug and diagnostic software tool to help resolve the customer resolve the technical problem, wherein the software product is the debug and diagnostic software tool and collecting the engagement data further comprises:

collecting engagement data pertaining to customer interactions with the debug and diagnostic software tool.

11. The automated system of claim 10, wherein the pattern is indicative of an average user interaction time that is of atypical length or a tendency to abort the flow of visual elements at a location that is not a natural endpoint.

12. The automated system of claim 9, wherein the passive feedback generator is configured to:

identify a visual element within the flow of elements that is characterized, within the aggregated engagement data, by an anomalous average interaction time, wherein the repair ticket identifies a potential deficiency with the visual element.

13. The automated system of claim 9, wherein the passive feedback generator is configured to: identify a visual element in the flow of elements corresponding to a last-interacted-with element for a subset of customers providing the engagement data, wherein the repair ticket identifies a potential deficiency with the last-interacted-with element.

14. The automated system of claim 9, wherein the software product is a debug and diagnostic software tool and the passive feedback generator is further configured to:

analyze content of a support ticket opened by the customer after interacting with the debug and diagnostic software tool, the support ticket indicating a characteristic of a technical problem identified by the customer;

analyze the flow of visual elements for a reference to the characteristic of the technical problem; and determine that the flow of visual elements does not include the reference to the characteristic of the technical problem, wherein the repair ticket indicates that the debug and diagnostic software tool is deficient for failing to reference the characteristic of the technical problem reported by the customer.

15. One or more tangible computer-readable storage media encoding computer-executable instructions for executing a computer process that automatically identifies a root cause of customer dissatisfaction with a software product, the computer process comprising:

determining at each of a plurality of customer devices and by a processor that tracks quantities of time a user has spent interacting with various different elements of a flow of visual elements presented by the software product;

collecting, by the plurality of customer devices, engagement data pertaining to interactions between customers and the flow of visual elements presented by the software product, the engagement data indicating quantities of time that users have spent interacting with different elements within the flow of visual elements;

aggregating the engagement data to create aggregated engagement data;

detecting a trigger event indicating that a select customer is dissatisfied with the software product;

in response to the trigger event, analyzing the aggregated engagement data to identify a pattern corresponding to a location within the flow of visual elements, the pattern being indicative of an atypical user behavior;

in response to detecting the pattern, identifying a potentially deficient content item by correlating the location within the flow of visual elements with a particular content item being viewed at a time of the atypical user behavior;

in response to identifying the potentially deficient content item, determining a reason for the atypical user behavior by providing the potentially deficient content item to a first machine learning model trained to detect a predefined type of content deficiency;

receiving an output from the first machine learning model indicating that the potentially deficient content item is characterized by the predefined type of content deficiency; and in response to receiving the output from the first machine learning model, generating a repair ticket for a development team, the repair ticket identifying the software product and the predefined type of content deficiency identified by the first machine learning model.

16. The one or more tangible computer-readable storage media of claim 15, wherein the trigger event is a help support request identifying a technical problem encountered by a customer.

17. The one or more tangible computer-readable storage media of claim 16, wherein the computer process further comprises:

identifying a visual element within the flow of element that is characterized, within the aggregated engagement data, by an anomalous average interaction time, wherein the repair ticket identifies a potential deficiency with the visual element.

18. The one or more tangible computer-readable storage media of claim 16, wherein the computer process further comprises: identifying a visual element in the flow of elements corresponding to a last-interacted-with element for a subset of the customers, wherein the repair ticket identifies a potential deficiency with the last-interacted-with element.

19. The one or more tangible computer-readable storage media of claim 16, wherein the first machine learning model is trained on content elements and user ratings of the content elements.

* * * * *